United States Patent
Sun

(10) Patent No.: US 12,098,793 B1
(45) Date of Patent: Sep. 24, 2024

(54) QUICK COUPLING FOR PIPELINES

(71) Applicant: TAIZHOU JINQUAN COPPER INCORPORATED COMPANY, Yuhuan (CN)

(72) Inventor: Caiyou Sun, Yuhuan (CN)

(73) Assignee: TAIZHOU JINQUAN COPPER INCORPORATED COMPANY, Yuhuan (CN)

( * ) Notice: Subject to any disclaimer, the term of this patent is extended or adjusted under 35 U.S.C. 154(b) by 0 days.

(21) Appl. No.: 18/633,893

(22) Filed: Apr. 12, 2024

(51) Int. Cl.
*F16L 37/098* (2006.01)

(52) U.S. Cl.
CPC ................ *F16L 37/0987* (2013.01)

(58) Field of Classification Search
CPC .......... F16L 47/06; F16L 47/065; F16L 47/12
See application file for complete search history.

(56) References Cited

U.S. PATENT DOCUMENTS

2014/0033507 A1* 2/2014 Kluss .................. F16L 37/0915
285/369

* cited by examiner

*Primary Examiner* — Aaron M Dunwoody
(74) *Attorney, Agent, or Firm* — Daniel M. Cohn; Howard M. Cohn

(57) ABSTRACT

The present disclosure discloses a quick coupling for pipelines, and belongs to the technical field of pipeline couplings. The quick coupling includes a connector, a collar and a limiting assembly. A lined pipe in which a pipeline is inserted and connected is disposed inside the connector, and is internally provided with a flow path communicating with the pipeline, an insertion connection groove in which the pipeline is inserted is formed between the lined pipe and the connector, the collar connects the limiting assembly onto the connector, the limiting assembly is positioned at an outer side of the lined pipe, and the limiting assembly cooperates with the lined pipe to limit the pipeline. The pipeline to be connected is directly inserted into the insertion connection groove from the limiting assembly, so that a connection effect of the quick coupling and the pipeline can be effectively improved.

9 Claims, 7 Drawing Sheets

QUICK COUPLING FOR PIPELINES

TECHNICAL FIELD

The present disclosure belongs to the technical field of pipeline couplings, and in particular to a quick coupling for pipelines.

BACKGROUND

In daily production and life, many fluids need to be transmitted through pipelines, but the length of pipelines is limited, so two or more pipelines need to be connected through pipeline couplings to increase the overall length of the pipelines. Pipeline couplings are also needed for connecting pipelines and water dispensers.

A Chinese patent with a publication patent number of CN201836571U discloses a quick coupling for pipelines, including a coupling body, and a locking cap configured to prevent an internal component from retreating, a locking cap stop component disposed on a pipeline insertion end of the coupling body and configured to prevent the locking cap from retreating, a dismounting ring configured to relieve the clamping of the pipeline, a clamping ring provided with an annular elastic flange and a plurality of clamping teeth for tightly clamping an outer wall of the pipeline, a cone seat glidingly connected with an inner wall of the coupling body and configured to prevent the clamping ring from moving towards a pipeline insertion direction, a cone seat shoulder disposed on the inner wall of the coupling body and configured to prevent the cone seat from moving towards the pipeline insertion direction, an O-shaped sealing ring configured to form sealed connection with the outer wall of the pipeline after the pipeline is inserted into the coupling, an O-shaped sealing ring shoulder disposed on the inner wall of the coupling body and configured to prevent the O-shaped sealing ring from moving towards the pipeline insertion direction, and a stop component disposed on the inner wall of the coupling body and configured to prevent the pipeline from moving along the insertion direction are sequentially disposed inside the coupling body in a pipeline insertion direction.

The above technical solution has the following defects: when the above quick coupling is used as a coupling for a hose, an end portion of the hose is inserted into the coupling body, the clamping teeth of the clamping ring are tightly abutted against an outer wall of the hose. When liquid is introduced into the hose, and the hose expands, the clamping teeth may be further tightly abutted against the outer wall of the hose to clamp the hose to prevent the hose from being disconnected from the coupling. Under the condition of high temperature in summer in a low-latitude area, the hose may be heated to be softened. If the pressure in the hose at this moment is reduced, or if no water is introduced into the hose, the clamping teeth may still extrude the hose, so that the hose inwards deforms, an inner diameter of the hose in positions of the clamping teeth decreases, and a flow volume of a medium in the hose may be finally reduced. Additionally, after the hose is heated and softened in the coupling, a limiting effect of the clamping teeth to the hose is reduced, the hose is easy to loosen, the hose may even be directly pulled out from the coupling, and a connection effect is poor. Moreover, in order to ensure the service life of the coupling body, the whole of the coupling body is made of a copper type metal, the material per se is expensive, and the material needs to be processed for many times to be assembled with other components, so that the production cost of the coupling is high, the reward is limited, and it is unfavorable for market competition.

SUMMARY

The present disclosure has the purpose of providing a quick coupling for pipelines by aiming at the above problems in the prior art. The present disclosure aims at solving the technical problem to know how to improve a connection effect between a coupling and a pipeline.

The above technical purpose of the present disclosure may be achieved through the following technical solution:

A quick coupling for pipelines includes a connector, a collar and a limiting assembly. A lined pipe in which a pipeline is inserted and connected is disposed inside the connector, a flow path communicating with the pipeline is formed inside the lined pipe, an insertion connection groove in which the pipeline is inserted is formed between the lined pipe and the connector, the collar connects the limiting assembly onto the connector, the limiting assembly is positioned at an outer side of the lined pipe, and the limiting assembly cooperates with the lined pipe to limit the pipeline.

In the above quick coupling, a material of the connector includes a plastic or a metal.

In the above quick coupling, the lined pipe and the connector are integrally formed, and an outer end of the lined pipe is provided with a guide surface.

In the above quick coupling, an end portion of the connector far away from the lined pipe is provided with a connecting end, a sheath is disposed outside the connecting end, and a shape of an outer wall of the connecting end is the same as a shape of an outer wall of the sheath.

In the above quick coupling, a material of the sheath is a hard metal.

In the above quick coupling, an outer end of the flow path is provided with a flow guide surface communicating with the pipeline.

In the above quick coupling, the collar is sheathed on an end portion of the connector, two ends of the collar are respectively provided with a first curling and a second curling, the first curling is attached to a bulge outside the connector, and the second curling is attached to an outer wall of the limiting assembly.

In the above quick coupling, the limiting assembly includes a base, a pressing cap and a clamping ring, the collar connects the base and the connector, a limiting groove and an assembly hole communicating with each other are formed inside the base, the pressing cap and the clamping ring are both disposed in the limiting groove, the pressing cap and the limiting groove cooperate with each other to limit the clamping ring, a plurality of clamping teeth are disposed at intervals in a circumference direction inside the clamping ring, the clamping teeth all bend in a direction towards the connector and are near an outer wall of the lined pipe, an end portion of each of the clamping teeth is respectively provided with a sharp edge, and one end of the pressing cap near the clamping teeth is provided with an avoiding surface.

In above the quick coupling, an outer wall of the pressing cap is provided with a flange, a positioning groove in which the flange is installed is formed in the limiting groove, and the positioning groove limits the flange.

In the above quick coupling, an installing groove is formed on the connector, a sealing ring is disposed in the installing groove, the pressing cap cooperates with the installing groove to limit the sealing ring, and an inner ring of the sealing ring is able to be tightly abutted against an outer wall of the pipeline.

Based on the above, compared with the prior art, the present disclosure has the following beneficial effects:

A pipeline to be connected is directly inserted into the insertion connection groove from the limiting assembly, so that an inner wall of the pipeline to be connected is attached to the outer wall of the lined pipe, the lined pipe supports the inner wall of the pipeline to be connected, an inner diameter of the pipeline to be connected cannot decrease at the lined pipe even if the pipeline is extruded by the limiting assembly, the limiting assembly can ensure a pipeline limiting quality no matter whether the pipeline is in a high-temperature or low-temperature environment, and a connection effect of the quick coupling and the pipeline can be effectively improved. Additionally, the connector integrally uses a plastic, and then, the limiting assembly and the connector are connected into a whole through the collar. The production cost of the quick coupling can be reduced. The structure strength and the wear resistance of the connecting end can be improved through the sheath outside the connecting end, and the service life of the quick coupling is ensured.

Figure 1:
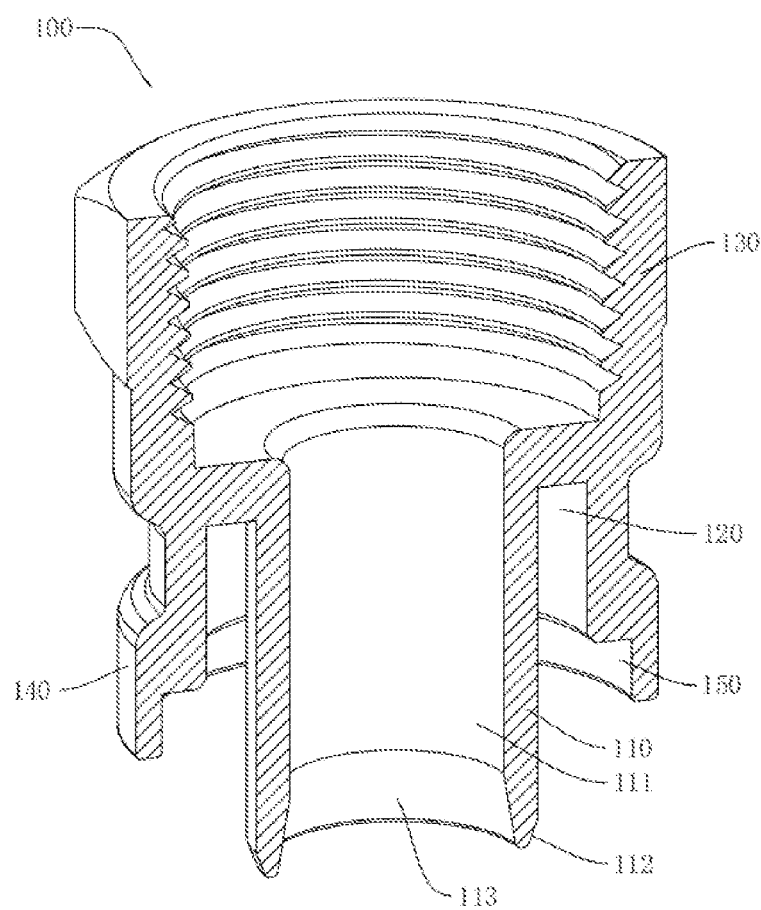
FIG. 1 is a schematic sectional view of a connector.
Figure 2:
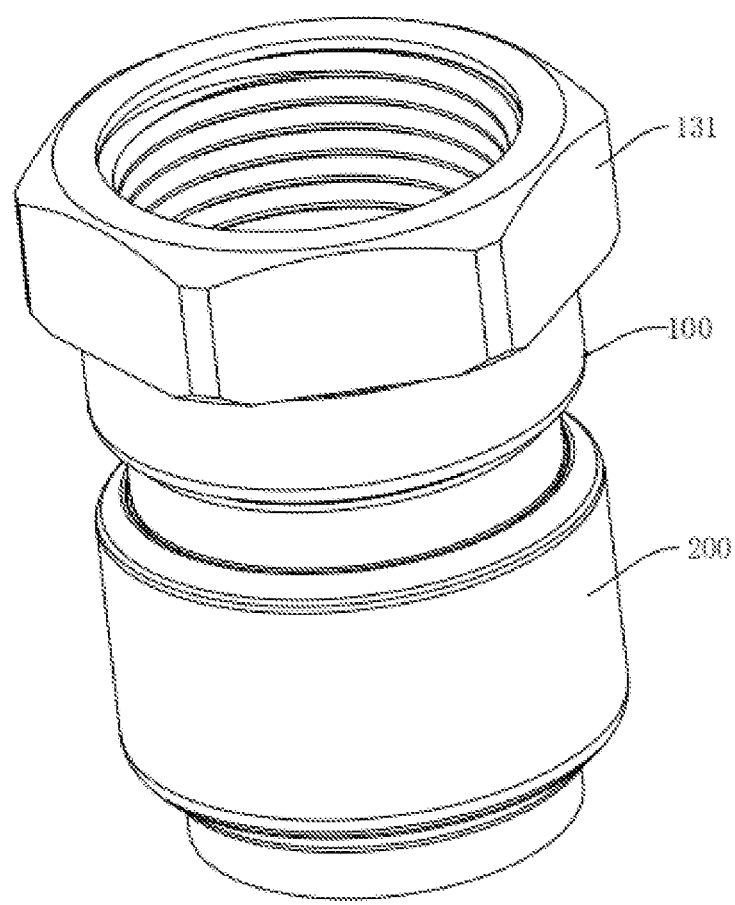
FIG. 2 is a schematic diagram of an external structure of an embodiment.

In the figures, 1 denotes a pipeline,
100 denotes a connector, 110 denotes a lined pipe, 111 denotes a flow path, 112 denotes a guide surface, 113 denotes a flow guide surface, 120 denotes an insertion connection groove, 130 denotes a connecting end, 131 denotes a sheath, 140 denotes a bulge, 150 denotes an installing groove, 151 denotes a sealing ring,
200 denotes a collar, 210 denotes a first curling, 220 denotes a second curling,
300 denotes a liming assembly, 310 denotes a base, 311 denotes a limiting groove, 3111 denotes a positioning groove, 312 denotes an assembly hole, 3121 denotes a step surface, 320 denotes a pressing cap, 321 denotes an avoiding surface, 322 denotes a flange, 330 denotes a clamping ring, 331 denotes a clamping tooth, 332 denotes a sharp edge, 340 denotes an unlocking pipe, 341 denotes a center hole, 342 denotes a plug, and 3421 denotes an inclined surface.

DETAILED DESCRIPTION

The present disclosure will be further described in detail below in conjunction with accompanying drawings, but the present disclosure is not limited to these embodiments.

A quick coupling for pipelines, as shown in FIG. 1 to FIG. 7, includes a connector 100, a collar 200 and a limiting assembly 300. A lined pipe 110 in which a pipeline 1 is inserted and connected is disposed inside the connector 100. A flow path 111 communicating with the pipeline 1 is formed inside the lined pipe 110. An outer end of the lined pipe 110 is positioned in the limiting assembly 300. An insertion connection groove 120 in which the pipeline 1 is inserted is formed between the lined pipe 110 and the connector 100. The collar 200 connects the limiting assembly 300 to an end portion of the connector 100. The pipeline 1 passes through the limiting assembly 300 and are inserted and connected to an outer wall of the lined pipe 110, and then, the limiting assembly 300 cooperates with the lined pipe 110 to limit the pipeline 1.

A material of the connector 100 includes a PPSU plastic or a cheap metal. In some implementations, the lined pipe 110 and the connector 100 are connected in a connection manner of clamping connection, threaded connection or integral formation. The lined pipe 110 and the connector 100 use the same material.

The outer end of the lined pipe 110 is provided with a guide surface 112 convenient for inserting and connecting an end portion of the pipeline 1 to be connected. An outer end of the flow path 111 is provided with a flow guide surface 113 communicating with the pipeline 1 to be connected.

Figure 3:
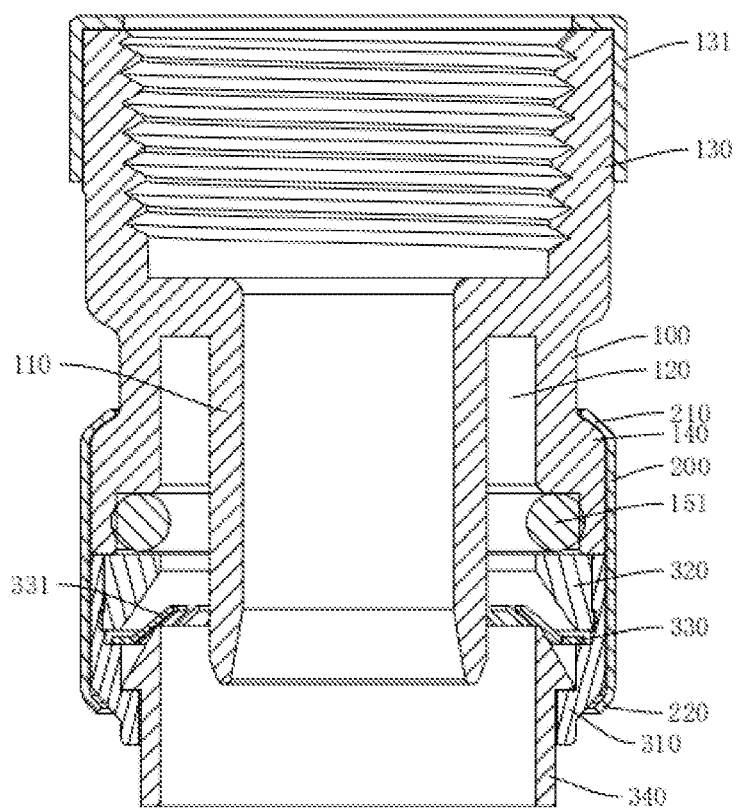
FIG. 3 is a schematic sectional view of FIG. 2.

As shown in FIG. 1 and FIG. 3, the end portion of the connector 100 far away from the lined pipe 110 is provided with a connecting end 130, the connecting end 130 communicates with the flow path 111, and the connecting end 130 is configured to connect a matched coupling or a water dispenser. A sheath 131 covers the outside the connecting end 130, and additionally, a shape of an outer wall of the connecting end 130 is the same as a shape of an outer wall of the sheath 131. For example, if the outer wall of the connecting end 130 is in a hexagonal shape, the external shape of the sheath 131 is also the hexagonal shape.

A material of the sheath 131 is a hard metal. The hard metal is preferably stainless steel, high-strength aluminum alloy or other alloy materials. The sheath 131 is configured to strengthen the structural strength and wear resistance of the connecting end 130 to thus prolong the service life of the connecting end.

The collar 200 is sheathed on the end portion of the connector 100, two ends of the collar 200 are respectively provided with a first curling 210 and a second curling 220, the first curling 210 is attached to a bulge 140 outside the connector 100, and the second curling 220 is attached to an outer wall of the limiting assembly 300.

As shown in FIG. 3 to FIG. 6, the limiting assembly 300 includes a base 310, a pressing cap 320, a clamping ring 330 and an unlocking pipe 340. The collar 200 covers the outside of the base 310 and is connected with the connector 100. Additionally, the second curling 220 is attached to an end portion of the base 310, a limiting groove 311 and an assembly hole 312 communicating with each other are formed inside the base 310, the clamping ring 330 is disposed at a groove bottom of the limiting groove 311, the pressing cap 320 is disposed in an opening position of the limiting groove 311 and near the connector 100, additionally, the pressing cap 320 and the limiting groove 311 cooperate with each other to limit the clamping ring 330, a plurality of clamping teeth 331 are disposed at intervals in a circumference direction inside the clamping ring 330, each of the clamping teeth 331 has the elastic deformation performance, each of the clamping teeth 331 bends in a direction towards the connector 100 and are near the outer wall of the lined pipe 110, and an end portion of each of the clamping teeth 331 is respectively provided with a sharp edge 332 to ensure the smooth embedment of the clamping teeth 331 into an outer wall of the pipeline 1. Additionally, the sharp edge 332 may guide the pipeline 1 inserted into the clamping ring 330, and one end of the pressing cap 320 near the clamping teeth 331 is provided with an avoiding surface 321 for allowing the deformation of each of the clamping teeth 331. The unlocking pipe 340 is glidingly disposed in the assembly hole 312, a center hole 341 in which the pipeline 1 is inserted is formed in the unlocking pipe 340, a step surface 3121 is formed inside the assembly hole 312, and the step surface 3121 limits a plug 342 of an inner end of the unlocking pipe 340, so that the plug 342 may slide and move between the step surface 3121 and the clamping teeth 331. An outer wall of the plug 342 is provided with an inclined surface 3421 capable of extruding the clamping teeth 331 to deform towards the avoiding surface 321.

Figure 4:
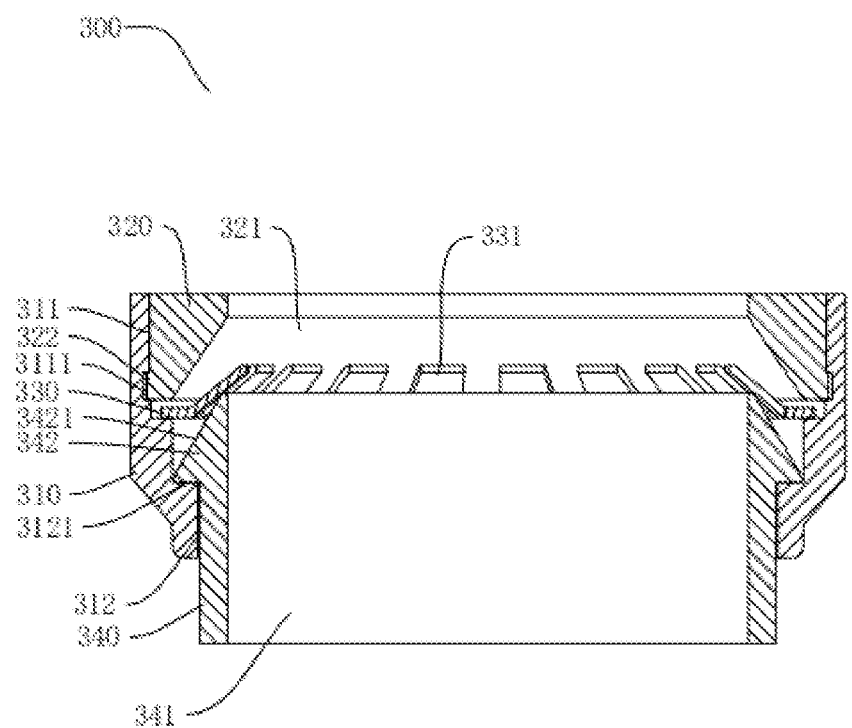
FIG. 4 is a schematic sectional view of a limiting assembly.
Figure 5:
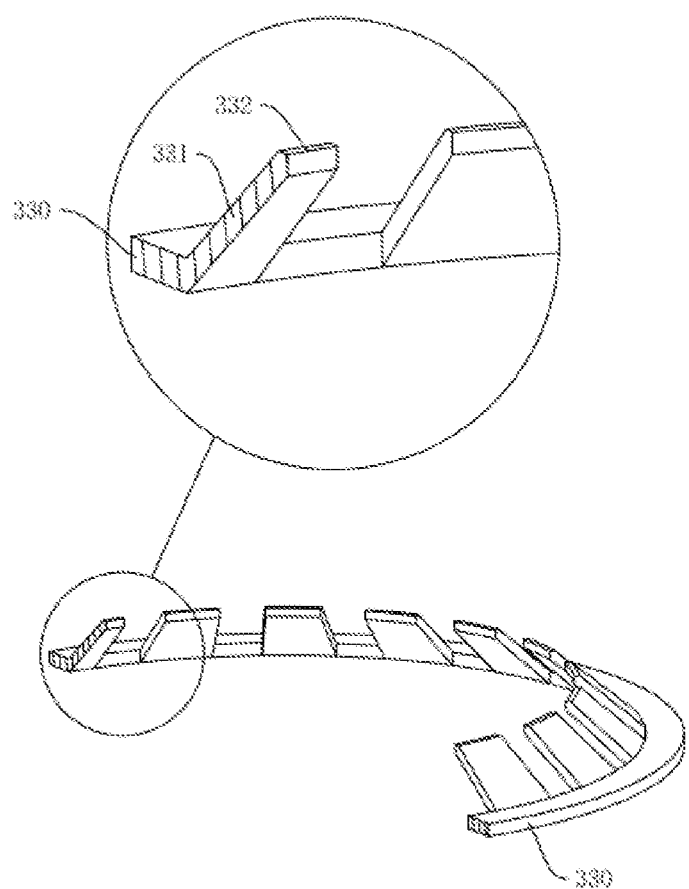
FIG. 5 is a schematic sectional view of a clamping ring.
Figure 6:
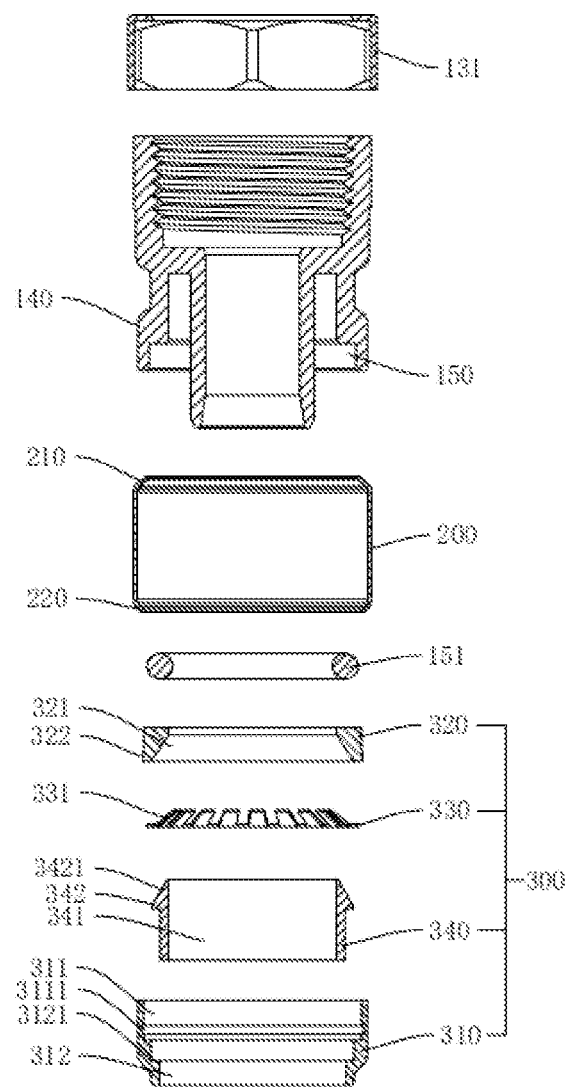
FIG. 6 is a schematic sectional view of an exploded structure of FIG. 2.
Figure 7:
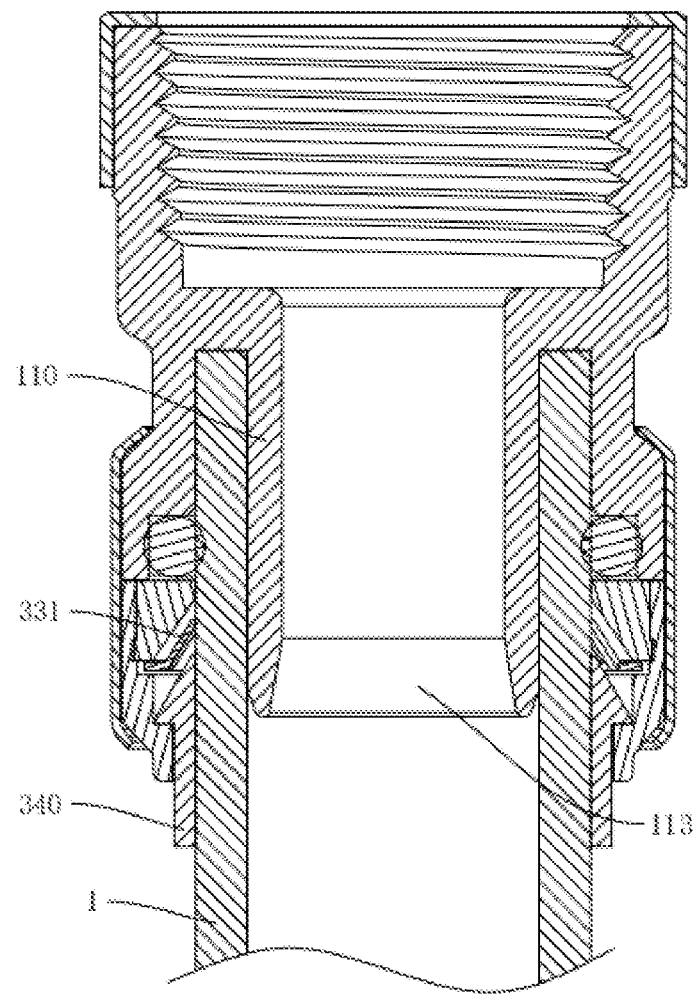
FIG. 7 is a schematic diagram after an embodiment is connected with a pipeline.

As shown in FIG. 4, preferably, an outer wall of the pressing cap 320 is provided with a flange 322, a positioning groove 3111 in which the flange 322 is installed is formed in the limiting groove 311, and the positioning groove 3111 limits the flange 322, so that the position of the clamping ring 330 in the limiting groove 311 is ensured. At the same time, the limiting assembly 300 can form a whole component to achieve convenient assembly.

An installing groove 150 is formed in the end portion of the connector 100 near the base 310, a sealing ring 151 is disposed in the installing groove 150, the pressing cap 320 cooperates with the installing groove 150 to limit the sealing ring 151, and an inner ring of the sealing ring 151 is able to be tightly abutted against the outer wall of the pipeline 1, so that the air tightness between the pipeline 1 and the insertion connection groove 120 is improved.

The present disclosure has the following working principle:

The pipeline 1 to be connected is a hose, an end portion of the pipeline 1 is inserted into the center hole 341, through the guiding effect of the guide surface 112 and the sharp edge 332, the end portion of the pipeline 1 may be more easily inserted to the outside of the lined pipe 110, the pipeline 1 communicates with the flow path 111 after the end portion of the pipeline 1 enters the insertion connection groove 120, additionally, the clamping teeth 331 rightly press the pipeline 1 outside the lined pipe 110, an inner wall of the sealing ring 151 is tightly abutted against the outer wall of the pipeline 1, and the connection between the quick coupling and the pipeline 1 to be connected is completed. If the pipeline 1 is disconnected from the insertion connection groove 120 due to external force, the clamping teeth 331 may deform in a direction towards the plug 342 through being driven by the pipeline 1, the clamping teeth 331 further clamp the outer wall of the pipeline 1 to further press the pipeline 1 to the outer wall of the lined pipe 110, and the separation of the pipeline 1 from the connector 100 is avoided.

When the pipeline 1 needs to be dismounted from the quick coupling, the unlocking pipe 340 only needs to be pressed, so that the plug 342 extrudes each of the clamping teeth 331 to the direction of the avoiding surface 321, and the pipeline 1 loses the limitation by the clamping teeth 331 and may be pulled away from the insertion connection groove 120.

After the connecting end 130 is connected with the water dispenser, the pipeline 1 may convey a medium to the water dispenser. After the connecting end 130 is connected with another coupling, the pipeline 1 may convey a medium to this coupling. In a process that the pipeline 1 conveys the medium, the flow guide surface 113 may guide the medium to enter the flow path 111 so as to prevent the medium from being blocked in the lined pipe 110.

The above descriptions are merely exemplary implementations of the present disclosure, and are not intended to limit the protection scope of the present disclosure. The protection scope of the present disclosure is defined by the attached claims.

What is claimed is:

1. A quick coupling for pipelines, comprising a connector (100), a collar (200) and a limiting assembly (300), wherein a lined pipe (110) in which a pipeline (1) is inserted and connected is disposed inside the connector (100), a flow path (111) communicating with the pipeline (1) is formed inside the lined pipe (110), an insertion connection groove (120) in which the pipeline (1) is inserted is formed between the lined pipe (110) and the connector (100), the collar (200) connects the limiting assembly (300) onto the connector (100), the limiting assembly (300) is positioned at an outer side of the lined pipe (110), and the limiting assembly (300) cooperates with the lined pipe (110) to limit the pipeline (1);

wherein an end portion of the connector (100) far away from the lined pipe (110) is provided with a connecting end (130), a sheath (131) is disposed outside the connecting end (130), and a shape of an outer wall of the connecting end (130) is the same as a shape of an outer wall of the sheath (131).

2. The quick coupling according to claim 1, wherein a material of the connector (100) comprises a plastic or a metal.

3. The quick coupling according to claim 2, wherein the lined pipe (110) and the connector (100) are integrally formed, and an outer end of the lined pipe (110) is provided with a guide surface (112).

4. The quick coupling according to claim 1, wherein a material of the sheath (131) is a hard metal.

5. The quick coupling according to claim 1, wherein an outer end of the flow path (111) is provided with a flow guide surface (113) communicating with the pipeline (1).

6. The quick coupling according to claim 1, wherein the collar (200) is sheathed on an end portion of the connector (100), two ends of the collar (200) are respectively provided with a first curling (210) and a second curling (220), the first curling (210) is attached to a bulge (140) outside the connector (100), and the second curling (220) is attached to an outer wall of the limiting assembly (300).

7. The quick coupling according to claim 1, wherein the limiting assembly (300) comprises a base (310), a pressing cap (320) and a clamping ring (330), the collar (200) connects the base (310) and the connector (100), a limiting groove (311) and an assembly hole (312) communicating with each other are formed inside the base (310), the pressing cap (320) and the clamping ring (330) are both disposed in the limiting groove (311), the pressing cap (320) and the limiting groove (311) cooperate with each other to limit the clamping ring (330), a plurality of clamping teeth (331) are disposed at intervals in a circumference direction inside the clamping ring (330), the clamping teeth (331) all bend in a direction towards the connector (100) and are near an outer wall of the lined pipe (110), an end portion of each of the clamping teeth (331) is respectively provided with a sharp edge (332), and one end of the pressing cap (320) near the clamping teeth (331) is provided with an avoiding surface (321).

8. The quick coupling according to claim 7, wherein an outer wall of the pressing cap (320) is provided with a flange (322), a positioning groove (3111) in which the flange (322) is installed is formed in the limiting groove (311), and the positioning groove (3111) limits the flange (322).

9. The quick coupling according to claim 7, wherein an installing groove (150) is formed on the connector (100), a sealing ring (151) is disposed in the installing groove (150), the pressing cap (320) cooperates with the installing groove (150) to limit the sealing ring (151), and an inner ring of the sealing ring (151) is able to be tightly abutted against an outer wall of the pipeline (1).

\* \* \* \* \*